(12) United States Patent
Aweya et al.

(10) Patent No.: US 7,336,672 B1
(45) Date of Patent: Feb. 26, 2008

(54) CONSTANT GAIN CONTROLLER FOR ACTIVE QUEUE MANAGEMENT

(75) Inventors: James Aweya, Kanata (CA); Delfin Y. Montuno, Kanata (CA); Michel Ouellette, Plantagenet (CA); Zhonghui Yao, Kanata (CA); Victor Firoiu, Westford, MA (US)

(73) Assignee: Nortel Networks Limited, St. Laurent, Quebec ( * ) Notice: Subject to any disclaimer, the term of this patent is extended or adjusted under 35 U.S.C. 154(b) by 994 days.

(21) Appl. No.: 10/422,796

(22) Filed: Apr. 25, 2003

Related U.S. Application Data

(63) Continuation-in-part of application No. 09/635,898, filed on Aug. 11, 2000, now Pat. No. 6,788,697, which is a continuation-in-part of application No. 09/455,445, filed on Dec. 6, 1999, now Pat. No. 6,690,645.

(51) Int. Cl.
*H04L 12/28* (2006.01)
(52) U.S. Cl. .................................................. 370/412
(58) Field of Classification Search ................. None
See application file for complete search history.

(56) References Cited

U.S. PATENT DOCUMENTS 6,252,848 B1 * 6/2001 Skirmont .................... 370/229

OTHER PUBLICATIONS

Aweya et al, A Linear System Analysis of RED, Computer Communications, pp. 1735-1750, 2002.*
Aweya et al, An Optimized-Oriented View of Random Early Detection, Computer Networks, vol. 24, pp. 1170-1180, 2001.*
Firoiu et al, A Study of Active Queue Management for Congestion Control, IEEE, pp. 1435-1444, 2000.*
J.G. Ziegler and N.B. Nichols, "Optimum Setting for Automatic Controllers," *Transactions of the ASME*, vol. 64, 1942, pp. 759-768.
C.V. Hollot, V. Misra, D. Townsley, and W.B. Gong, "A Control Theoretic Analysis of RED," *Proc. IEEE INFOCOM 2001*, 2001, pp. 1510-1519.
C.V. Hollot, V: Misra, D. Townsley, and W.B. Gong, "On Designing Improved Controllers for AQM Routers Supporting TCP Flows," *Proc. IEEE INFOCOM 2001*, 2001, pp. 1726-1734.
Y. Chait, C. V. Hollot, and V. Misra, "Fixed and Adaptive Model-Based Controllers for Active Queue Management," *Proc. American Control Conf.*, Arlington, VA, Jun. 25-27, 2001, pp. 2981-2986.
V. Misra, W.B. Gong, and D. Townsley, "Fluid-based Analysis of a Network of AQM Routers Supporting TCP Flows with an Application to RED," *Proc. ACM SIGCOMM 2000*, 2000, pp. 151-160.

(Continued)

*Primary Examiner*—Frank Duong
(74) *Attorney, Agent, or Firm*—Hunton & Williams LLP

(57) ABSTRACT

Various techniques for queue management based on random early detection (RED) are disclosed herein. In particular, a method for generating a drop probability for an incoming packet in a device having a queue to buffer packets between segments of a network is provided. The method comprises determining, upon receipt of an incoming packet, a size of the queue and determining an error based at least in part on a difference between the queue size and a threshold. The method further comprises determining a drop probability for the incoming packet based at least in part on the error and a constant gain factor. The constant gain factor may be based at least in part on a linearized second order dynamic model of the network.

22 Claims, 7 Drawing Sheets

OTHER PUBLICATIONS

G.J. Silva, A. Datta, and S.P. Bhattacharyya, "Determination of Stabilizing Feedback Gains for Second-order Systems with Time Delay," *Proc. American Control Conf.,* Arlington, VA, Jun. 25-27, 2001, pp. 4658-4663.

L.S. Pontryagin, "On the zeros of some Elementary Transcedental Function," English Translation, *American Mathematical Society Translation,* vol. 2, 1955, pp. 95-110.

V.L. Kharitonov and A.P. Zhabko, "Robust Stability of Time-delay Systems," *IEEE Trans. Automatic Control,* vol. 39, No. 12, Dec. 1994, pp. 2388-2397.

V. Jacobson, "Congestion Avoidance and Control," *Proc. ACM SIGCOMM '88,* Aug. 1988, pp. 314-329.

S. Floyd and V. Jacobson, "Random Early Detection Gateways for Congestion Avoidance," *IEEE/ACM Trans. Networking,* vol. 1, No. 4, Aug. 1993, pp. 397-413.

B. Braden, et al, "Recommendation on Queue Management and Congestion Avoidance in the Internet," *IETF RFC 2309,* Apr. 1998.

S. Floyd and V. Jacobson, "On Traffic Phase Effects in Packet-Switched Gateways," *Internetworking: Research and Experience,* vol. 3, No. 3, Sep. 1992, pp. 115-156.

J.G. Ziegler and N.B. Nichols, "Process Lags in Automatic-Control Circuits," *Trans. AMSE,* vol. 65, 1943, pp. 433-444.

T.J. Ott, T.V. Lakshman, and L.H. Wong, "SRED: Stabilized RED," *Proc. IEEE INFOCOM'99,* NY, Mar. 21-25, 1999, pp. 1346-1355.

W. Feng, D.D. Kandlur, D. Saha, and D.G. Shin, "Techniques for Eliminating Packet Loss in Congested TCP/IP Networkings," *Technical Report* CSE-TR-349-97, Dept. of EECS, University of Michigan, Nov. 1997.

S. Floyd, "TCP and Explicit Congestion Notification," *ACM Computer Communication Review,* vol. 24, No. 5, Oct. 1994, pp. 10-23.

W. Feng, D.D. Kandlur, D. Saha, and D.G. Shin, "BLUE: A New Class of Active Queue Management Algorithms," *Technical Report* CSE-TR-387-99, Dept. of EECS, University of Michigan, Apr. 1999.

D. Lin and R. Morris, "Dynamics of Random Early Detection," *Proc. ACM SIGCOMM'97,* Sep. 1997.

R. Morris "TCP Behavior with Many Flows," *IEEE Int'l Conf. Network Protocols,* Oct. 1997.

C. Villamizar and C. Song, "High Performance TCP in ANSNET," *ACM Computer Commun. Rev.,* vol. 24, No. 5, Oct. 1995.

W. Stevens, "TCP Slow Start, Congestion Avoidance, Fast Retransmit, and Fast Recovery Algorithms," *IETF RFC 2001,* Jan. 1997.

J. Aweya, M. Ouellette, D. Y. Montuno, and A. Chapman, "A Load Adaptive Mechanism for Buffer Management," *Computer Networks,* vol. 36, No. 5, Aug. 2001, pp. 709-728.

J. Aweya, M. Ouellette, D. Y. Montuno, and A. Chapman, "Enhancing TCP Performance with a Load Adaptive RED Mechanism," *International Journal of Network Management,* vol. 11, Issue 1, Jan. 2001, pp. 31-50.

R. Morris, "Scalable TCP Congestion Control, " *Proc. IEEE INFOCOM 2000,* 2000, pp. 1176-1183.

S. Floyd, "Connections with Multiple Congested Gateways in Packet-Switched Networks Part 1: One-way Traffic," *ACM Computer Communications Review,* vol. 21, No. 5, Oct. 1991.

M. Mathis, J. Semke, J. Mahdavi, and T. Ott, "The Macroscopic Behavior of the TCP Congestion Avoidance Algorithm," *ACM Computer Communications Review,* vol. 27, No. 3, Jul. 1997.

J. Padhye, V. Firoiu, D. Townsley, and J. Kurose, "Modeling TCP Throughput: A Simple Model and Its Empirical Validation," *Proc. ACM SIGCOMM'98,* 1998.

J. Aweya, M. Ouellette, D.Y. Montuno, "An Optimization-Oriented View of Random Early Detection," *Computer Networks,* vol. 24, 2001, pp. 1170-1187.

J. Aweya, M. Ouellette, D.Y. Montuno, "A Control Theoretic Approach to Active Queue Management," *Computer Networks,* vol. 36, Jul. 2001, pp. 203-235.

Gerard J. Foschini et al., "Sharing Memory Optimally," *IEEE Transactions on Communications,* vol. COM-31, No. 3, Mar. 1983, pp. 352-360.

Farouk Kamoun et al., "Analysis of Shared Finite Storage in a Computer Network Node Environment Under General Traffic Conditions," *IEEE Transactions on Communications,* vol. COM-28, No. 7, Jul. 1980, pp. 992-1003.

Guy Latouche, "Exponential Servers Sharing a Finite Storage: Comparison of Space Allocation Policies", *IEEE Transactions on Communications,* vol. COM-28, No. 6, Jun. 1980, pp. 910-915.

Abhijit K. Choudhury et al., "Dynamic Queue Length Thresholds for Shared-Memory Packet Switches," *IEEE/ACM Transactions of Networking,* vol. 6, No. 2, Apr. 1998, pp. 130-140.

Ruixue Fan et al., "An Optimal Buffer Management Scheme with Dynamic Thresholds," *Global Telecommunications Conference—Globecom '99, General Conference (Part B),* pp. 631-637.

Van Jacobson, "Congestion Avoidance and Control" paper, University of California, Lawrence Berkeley Laboratory, 1988, pp. 314-329.

W. Stevens, "TCP Slow Start, Congestion Avoidance, Fast Retransmit, and Fast Recovery Algorithms" Memo to the Network Working Group, Jan. 1997, pp. 1-6.

B. Braden et al., "Recommendations on Queue Management and Congestion Avoidance in the Internet" Memo to the Network Working Group, Apr. 1998, pp. 1-17.

Sally Floyd et al., "Random Early Detection Gateways for Congestion Avoidance," *IEEE/ACM Transactions on Networking,* vol. 1, No. 4, Aug. 1993, pp. 397-413.

Sally Floyd, "TCP and Explicit Congestion Notification" paper, University of California, Lawrence Berkeley Laboratory.

Hong-Yi Tzeng et al., "Performance of TCP over UBR in ATM with EPD and Virtual Queuing Techniques," *Computer Communications 21,* 1998, pp. 1070-1079.

Rohit Goyal et al., "Improving the Performance of TCP Over the ATM-UBR Service" paper, Ohio State University, Department of Computer and Information Science, pp. 1-23.

\* cited by examiner

Table 1: Set of stabilizing gains for different plant configurations

| Capacity | C (packets/second) | $N$ | $a_0$ | $a_1$ | $k$ | Range of $k_c$ (min, max) |
|---|---|---|---|---|---|---|
| T1 | $3.35 \times 10^2$ | 28 | 76.07 | 17.58 | $2.01 \times 10^3$ | $-9.47 \times 10^{-2}, 3.79 \times 10^{-2}$ |
| T3 | $9.71 \times 10^3$ | 800 | 75.01 | 17.44 | $5.89 \times 10^4$ | $-3.19 \times 10^{-3}, 1.27 \times 10^{-3}$ |
| OC3 | $3.36 \times 10^4$ | 2800 | 75.78 | 17.54 | $2.02 \times 10^5$ | $-9.37 \times 10^{-4}, 3.75 \times 10^{-4}$ |
| OC3 | $3.36 \times 10^4$ | 100 | 2.71 | 8.04 | $5.66 \times 10^6$ | $-1.25 \times 10^{-5}, 4.78 \times 10^{-7}$ |
| OC3 | $3.36 \times 10^4$ | 15 | 0.41 | 7.75 | $3.77 \times 10^7$ | $-1.80 \times 10^{-6}, 1.08 \times 10^{-8}$ |
| OC12 | $1.35 \times 10^5$ | 11000 | 74.18 | 17.34 | $8.28 \times 10^5$ | $-2.25 \times 10^{-4}, 8.96 \times 10^{-5}$ |
| OC12 | $1.35 \times 10^5$ | 400 | 2.7 | 8.04 | $2.28 \times 10^7$ | $-3.11 \times 10^{-6}, 1.18 \times 10^{-7}$ |
| OC12 | $1.35 \times 10^5$ | 60 | 0.4 | 7.74 | $1.518 \times 10^8$ | $-4.46 \times 10^{-7}, 2.67 \times 10^{-9}$ |
| OC48 | $5.40 \times 10^5$ | 45000 | 75.87 | 17.56 | $3.24 \times 10^6$ | $-5.85 \times 10^{-5}, 2.34 \times 10^{-5}$ |
| OC48 | $5.40 \times 10^5$ | 1600 | 2.7 | 8.04 | $9.11 \times 10^7$ | $-7.79 \times 10^{-7}, 2.96 \times 10^{-8}$ |
| OC48 | $5.40 \times 10^5$ | 250 | 0.42 | 7.75 | $5.83 \times 10^8$ | $-1.16 \times 10^{-7}, 7.23 \times 10^{-10}$ |
| 10Mbps | $2.17 \times 10^3$ | 180 | 75.51 | 17.51 | $1.31 \times 10^4$ | $-1.44 \times 10^{-2}, 5.77 \times 10^{-3}$ |
| 100Mbps | $2.17 \times 10^4$ | 1800 | 75.51 | 17.51 | $1.31 \times 10^5$ | $-1.44 \times 10^{-3}, 5.77 \times 10^{-4}$ |
| 100Mbps | $2.17 \times 10^4$ | 65 | 2.73 | 8.05 | $3.62 \times 10^6$ | $-1.96 \times 10^{-5}, 7.53 \times 10^{-7}$ |
| 1Gbps | $2.17 \times 10^5$ | 18000 | 75.51 | 17.51 | $1.31 \times 10^6$ | $-1.44 \times 10^{-4}, 5.77 \times 10^{-5}$ |
| 1Gbps | $2.17 \times 10^5$ | 650 | 2.73 | 8.05 | $3.62 \times 10^7$ | $-1.96 \times 10^{-6}, 7.53 \times 10^{-8}$ |
| 1Gbps | $2.17 \times 10^5$ | 100 | 0.42 | 7.75 | $2.36 \times 10^8$ | $-2.88 \times 10^{-7}, 1.78 \times 10^{-9}$ |
| 10Gbps | $2.17 \times 10^6$ | 180000 | 75.51 | 17.51 | $1.31 \times 10^7$ | $-1.44 \times 10^{-5}, 5.77 \times 10^{-6}$ |
| 10Gbps | $2.17 \times 10^6$ | 6500 | 2.73 | 8.05 | $3.62 \times 10^8$ | $-1.96 \times 10^{-7}, 7.53 \times 10^{-9}$ |
| 10Gbps | $2.17 \times 10^6$ | 1000 | 0.42 | 7.75 | $2.36 \times 10^9$ | $-2.88 \times 10^{-8}, 1.78 \times 10^{-10}$ |

Fig. 7

CONSTANT GAIN CONTROLLER FOR ACTIVE QUEUE MANAGEMENT

CROSS-REFERENCE TO RELATED APPLICATIONS

This patent application is a continuation-in-part application of U.S. patent application Ser. No. 09/635,898, filed Aug. 11, 2000 now U.S. Pat. No. 6,788,697, which is a continuation-in-part application of U.S. patent application Ser. No. 09/455,445, filed Dec. 6, 1999 now U.S. Pat. No. 6,690,645, both of which are hereby incorporated by reference herein in their entirety.

FIELD OF THE INVENTION

The present invention relates generally to buffer management and, more particularly, to an improved buffer management scheme employing a constant gain controller to dynamically adjust mark/drop probabilities used in congestion control.

BACKGROUND OF THE INVENTION

Queues and other buffering means are often employed in network devices to compensate for the transmission differential between the incoming packet rate and the outgoing packet rate. To prevent the overflow and/or underflow of the queue, various active queue management mechanisms may be employed. The basic idea behind active queue management mechanisms such as, for example, random early detection (RED), is to detect incipient congestion early and to convey congestion notification to the end-systems, allowing them to reduce their transmission rates before queue overflow and sustained packet loss occur.

In the basic RED scheme, as well as in improvements thereto such as described in the above-referenced related U.S. patent application Ser. No. 09/455,445, filed Dec. 6, 1999, a queue length average is maintained and used, along with a number of queue thresholds, to detect congestion. If congestion is detected, incoming packets are dropped (or marked, e.g., see S. Floyd, "TCP and Explicit Congestion Notification", ACM Computer Communication Review, Vol. 24, No. 5, October 1994, pp. 10-23) in a random probabilistic manner where the probability is a function of recent buffer fill history.

Despite the benefits associated with the above-described basic and improved RED schemes, there are still shortcomings associated therewith. One such shortcoming is that conventional RED-based mechanisms typically require tuning of various control parameters such as, for example, the queue threshold settings and the maximum drop probability. These tuning procedures usually are ad hoc or based on heuristics and, as such, often do not provide for optimal queue management. Moreover, conventional RED-based mechanisms generally do not stabilize the queue size and thus result in unpredictable results. Thus, there remains a need for enhancing the effectiveness of a RED-based mechanism by providing a systematic process for determining optimal settings for one or more control parameters of the RED-based mechanism to provide for stable and predictable results.

SUMMARY OF THE INVENTION

In a device having a queue to buffer packets between segments of a network, a method for generating a drop probability for an incoming packet is provided in accordance with at least one embodiment of the present invention. The method comprises determining, upon receipt of an incoming packet, a size of the queue and determining an error based at least in part on a difference between the queue size and a threshold. The method further comprises determining a drop probability for the incoming packet based at least in part on the error and a constant gain factor. The constant gain factor may be based at least in part on a linearized second order dynamic model of the network. In accordance with another embodiment of the present invention, a computer signal embodied in a carrier wave readable by a computing system and encoding a computer program of instructions for executing a computer process for performing the method is provided. In accordance with yet another embodiment of the present invention, at least one processor readable carrier for storing a computer program of instructions configured to be readable by at least one processor is provided. The computer program of instructions may be adapted to instruct the at least one processor to execute a computer process for performing the method.

In a device having a queue to buffer packets between segments of a network, a method for managing the queue is provided in accordance with an additional embodiment of the present invention. The method comprises generating, for an incoming packet, a drop probability based at least in part oh a linearized second order dynamic model of the network, comparing the drop probability with a random probability, and dropping the incoming packet when the drop probability is less than or equal to the random probability. In accordance with another embodiment of the present invention, a computer signal embodied in a carrier wave readable by a computing system and encoding a computer program of instructions for executing a computer process for performing the method is provided. In accordance with yet another embodiment of the present invention, at least one processor readable carrier for storing a computer program of instructions configured to be readable by at least one processor is provided. The computer program of instructions may be adapted to instruct the at least one processor to execute a computer process for performing the method.

In a device having a queue to buffer packets between segments of a network, a queue management apparatus is provided in accordance with an additional embodiment of the present invention. The queue management apparatus comprises a packet drop controller being adapted to determine a drop probability for an incoming packet based at least in part on an error between a size of the queue and a threshold and a constant gain factor. The queue management apparatus further comprises an add/drop module operably connected to the queue controller and being adapted to drop the incoming packet when the drop probability is less than or equal to a random probability. The constant gain factor may be based at least in part on a linearized second order dynamic model of the network.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a greater understanding of the present invention, reference is now made to the appended drawings. These drawings should not be construed as limiting the present invention, but are intended to be exemplary only.

FIG. 7 is a table illustrating exemplary ranges for a constant gain factor in various network configurations in accordance with at least one embodiment of the present invention.

DETAILED DESCRIPTION OF EXEMPLARY EMBODIMENT(S)

FIGS. 1-7 illustrate various exemplary techniques for efficient active queue management based at least in part on the use of a constant gain controller for dynamically adjusting the mark/drop probability used in random early detection (RED)-based algorithms and other similar algorithms. As described in detail below, the present invention provides guidelines for the selection of the constant gain controller parameter using various network parameters, including link capacity, maximum number of connections, round trip time, and the like. These guidelines, in one embodiment, may be developed from a second order linear model with time delay that approximates a non-linear dynamic model of the behavior of a packet-based network, such as a Transport Control protocol (TCP)-based network. Although various embodiments of the present invention are discussed below in the context of Transport Control protocol/Internet protocol (TCP/IP), the present invention may be utilized in other packet-based networks without departing from the spirit or the scope of the present invention.

Figure 1:
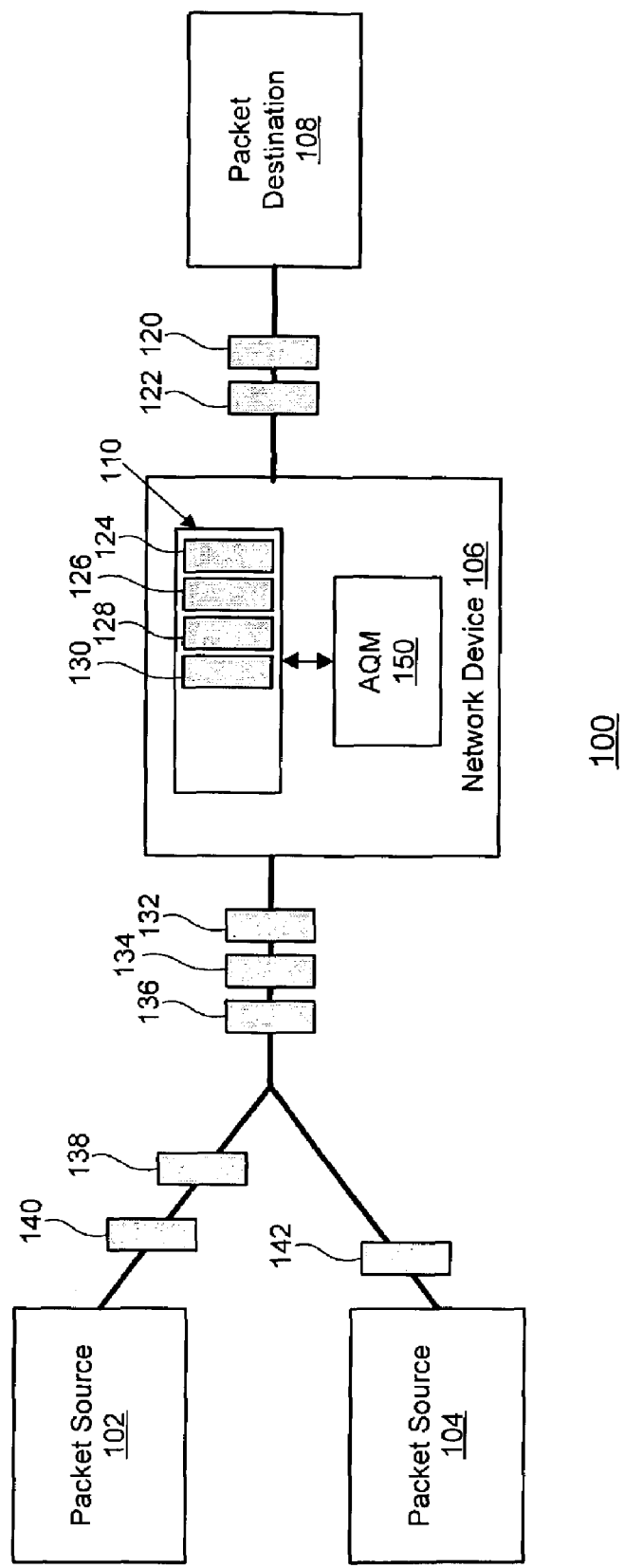
FIG. 1 is a schematic diagram illustrating an exemplary network utilizing an active queue management (AQM) mechanism in accordance with at least one embodiment of the present invention.

Referring now to FIG. 1, an exemplary network system 100 implementing an active queue management (AQM) mechanism 150 based in part on a constant gain controller is illustrated in accordance with at least one embodiment of the present invention. The network system 100, in the illustrated example, includes one or more packet sources (e.g., packet sources 102, 104), a network device 106, and one or more packet destinations (e.g., packet destination 108). The packet source(s) and packet destination(s) may include any of a variety of networked devices such as, for example, a networked personal computer, a switch, a bridge, a router, a customer premise equipment (CPE) and the like. The network device 106 may include any of a variety of network devices such as a router, a switch, and the like.

In at least one embodiment, the network device 106 is adapted to facilitate the transmission of data, encapsulated in network packets (e.g., packets 120-142), from the packet sources 102, 104 to the packet destination 108 and vice versa. Due to the potential transmission differential between the input network segment and the output network segment, the network device 106 implements one or more packet queues 110 for storing packets received by the packet sources 102, 104 prior to their transmission to the packet destination 108. As will be appreciated by those skilled in the art, it typically is advantageous to maintain the size of the queue 110 within a certain threshold (herein denoted as T). Accordingly, the network device 106 may be adapted to employ an AQM mechanism 150 based in part on a constant gain controller in determining whether to drop a packet received from one of the packet sources 102, 104 to maintain the size of the queue 110. As described in greater detail below, the constant gain controller, in one embodiment, may be adapted from a second order linear model with time delay that approximates a non-linear dynamic model of the behavior a packet-based network.

Referring now to FIGS. 2-6, an exemplary queue mechanism 200 (FIG. 2) and exemplary processes (FIGS. 3-6) of its operation are illustrated in accordance with at least one embodiment of the present invention. The queue mechanism 200 may be utilized to queue packets (e.g., packets 228-234) received from one or more packet sources over one or more packet-based networks, such as TCP/IP, and the like. The packet mechanism 200 may be utilized at any of a variety of network devices adapted to receive and process packets, including, for example, routers, switches, and the like.

As described in greater detail below, the queue mechanism 200 may be adapted for active queue management of the size of the queue 204 using a RED-based active queue management technique or a similar technique. As with the RED-based algorithms, the queue mechanism 200 may determine, for some or all incoming packets, a drop/mark probability $p_d$, compare drop/mark probability $p_d$ with a randomly generated (or pseudo-randomly generated) probability $p_r$ and drop or accept the packet based on this comparison. However, unlike conventional RED-based techniques, the queue mechanism 200, in at least one embodiment, may be adapted to determine the drop/mark probability $p_d$ based at least in part on a second order linear model of the packet network with time delay (described in greater detail with reference to FIG. 4).

Figure 2:
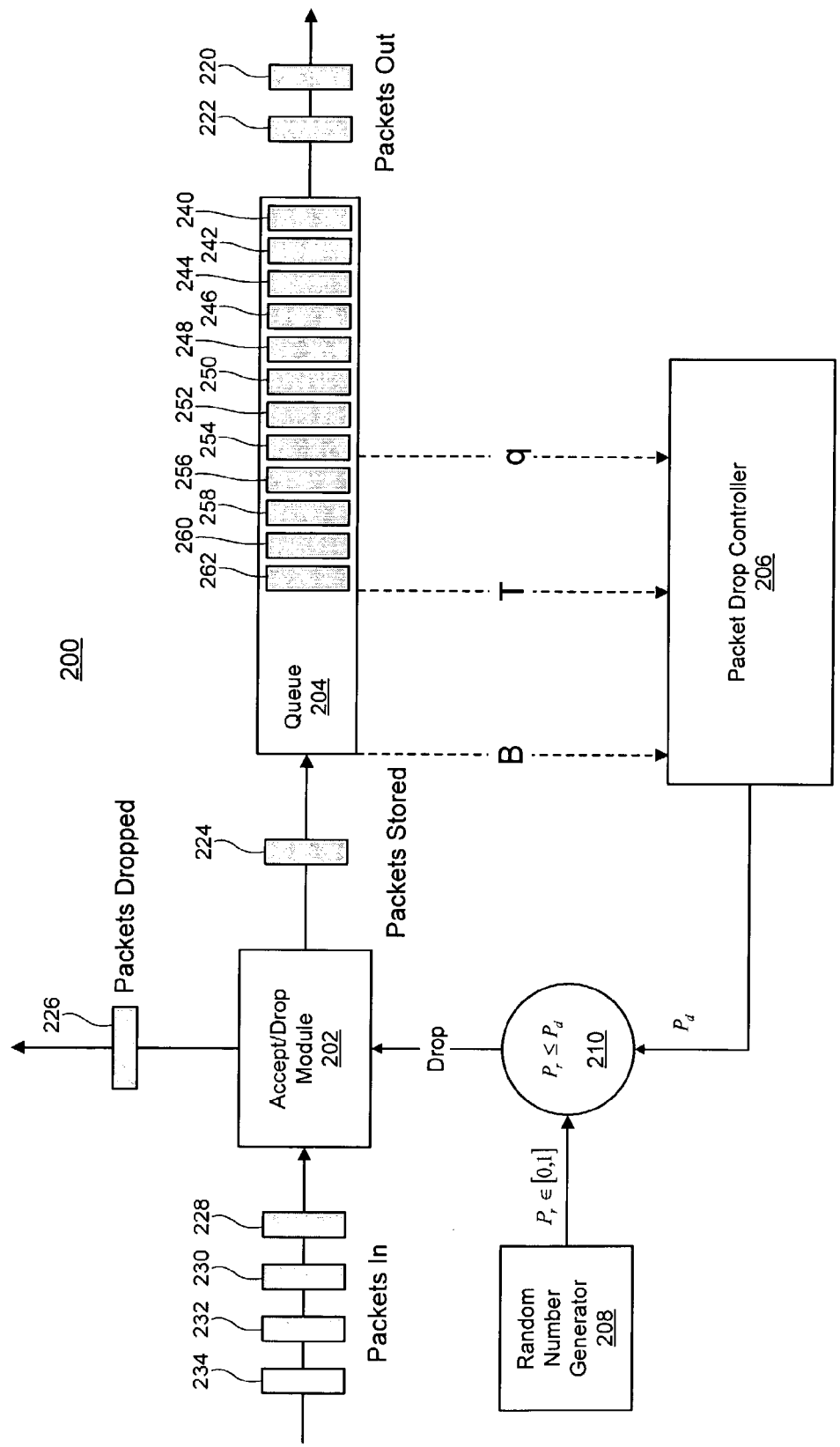
FIG. 2 is a schematic diagram illustrating the exemplary AQM mechanism of FIG. 1 in greater detail in accordance with at least one embodiment of the present invention.

In the illustrated example of FIG. 2, the queue mechanism 200 includes a packet add/drop module 202, one or more queues 204 (analogous to queue 110, FIG. 1), a packet drop controller 206, a random number generator 208 and a probability comparator 210. The components of the queue mechanism 200 may be implemented as software, hardware, firmware, or a combination thereof. To illustrate, the packet add/drop module 202 may include a hardware buffer adapted to buffer incoming packets (e.g., packets 228-234) until a decision is made on whether a buffered packet is to be stored in the queue 204 for further processing or dropped (or marked for drop at a point downstream in the network where resources are scarce). The random number generator 208 may include, for example, software executed by a processor to generate a random (or pseudo-random) number. Alternatively, the random number generator 208 may include a hardware component (e.g., an application specific integrated circuit (ASIC)) specifically adapted to generate a random number. The probability comparator 210 may include, for example, a set of executable instructions adapted to manipulate a processor to compare the two probabilities $p_r$, $p_d$ and output the result of the comparison to the packet add/drop module 202. The queue 204 may comprise any of a variety of known queuing mechanisms, such as, for example, a pointer-based first-in, first-out (FIFO) queue implemented in random access memory (RAM). The packet drop controller 206 may comprise, for example, a set of executable instructions adapted to manipulate one or more processors to determine one or more parameters of the queue 204 and determine the corresponding drop/mark probability $p_d$ from the parameters, as described below.

Figure 3:
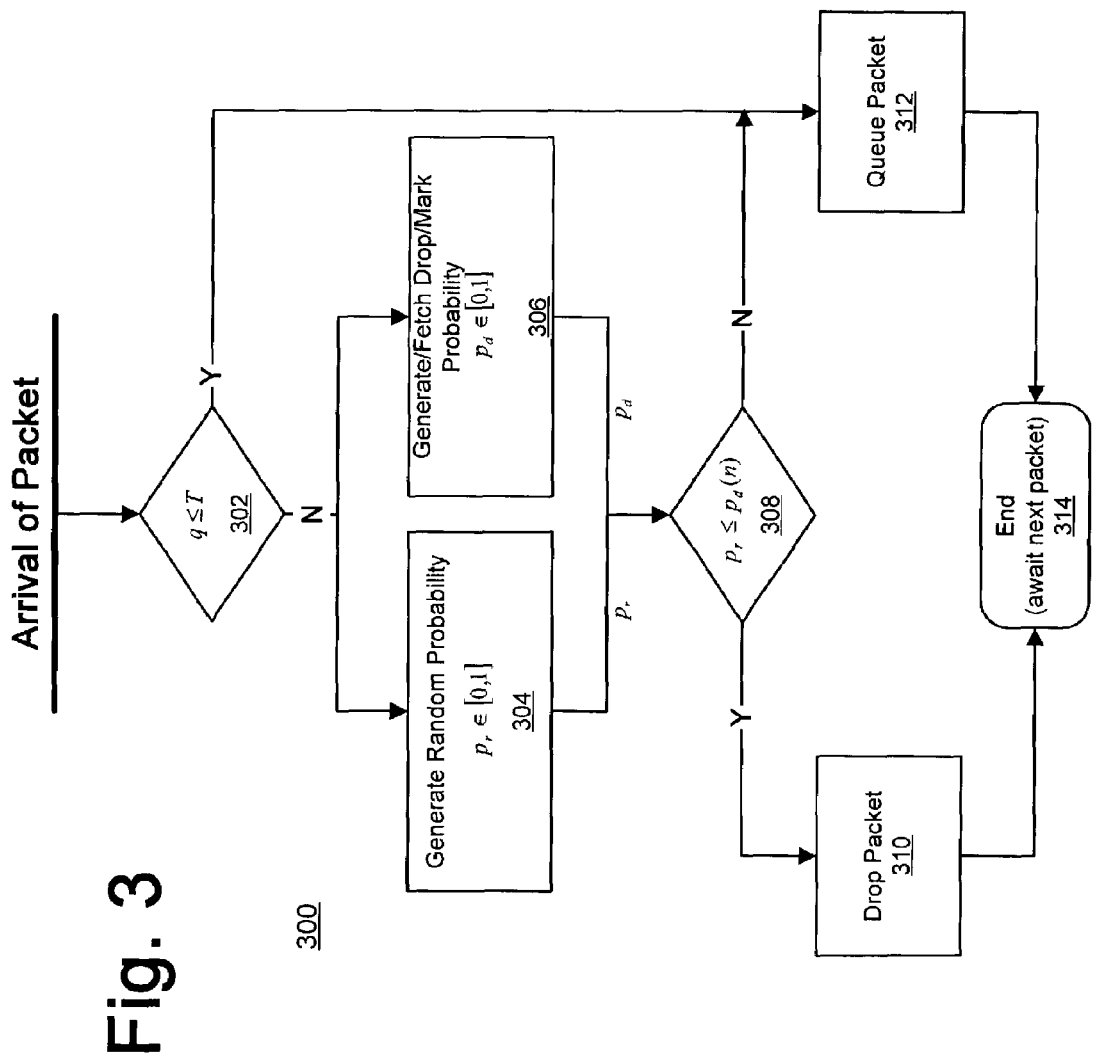
FIG. 3 is a flow diagram illustrating an exemplary operation of the AQM mechanism of FIG. 2 in accordance with at least one embodiment of the present invention.

FIG. 3 illustrates an exemplary process 300 of the queue mechanism 200. Upon arrival of an incoming packet at the network device implementing the queue mechanism 200 (e.g., network device 106, FIG. 1), the size of the queue 204, denoted as q, may be compared with a desired threshold, denoted as T, of the queue 204 at step 302. The size of the threshold T may be selected in any appropriate manner. For example, it may prove advantageous to select a value of $$\tfrac{1}{4}B, \tfrac{1}{3}B, \tfrac{1}{2}B, \tfrac{2}{3}B, \text{ or } \tfrac{3}{4}B,$$

where B denotes the maximum capacity of the queue 204. The size q of the queue 204 may be determined periodically (e.g., after a certain number of packets are received). Alternatively, the size q may be determined at the time of the receipt of the incoming packet.

In the event that the queue size q is less than or equal to the threshold T (i.e., $q \leq T$), the packet add/drop module 202 may be directed to store the incoming packet in the queue 204 (illustrated as stored packets 240-262) at step 312. In the event that size q of the queue 204 is greater than the desired threshold T (i.e., $q > T$), a decision may be made as to whether the incoming packet should be dropped or accepted such that the queue 204 may be reasonably maintained at or below the threshold T while still allowing the queue 204 to store packets above the threshold T when incoming traffic is temporarily bursty.

A dynamic random early detection (DRED) technique, discussed below, may be employed by the packet drop controller 206 to determine a drop/add probability for the incoming queue. At step 304, the random number generator 208 may generate a random probability $p_r \epsilon (0,1)$ and provide the random probability $p_r$ to the probability comparator 210. It will be appreciated that, depending on the implementation, the random probability may be an actual random probability or a pseudo-random probability.

At step 306, in one embodiment, the packet drop controller 206 may determine a drop/mark probability $p_d$ for the incoming packet. In at least one embodiment, the packet drop controller 206 implements a process 500 (FIG. 5) to determine the drop/mark probability $P_d$ based at least in part on a constant gain controller derived from a linearized second order model of the packet network from which the packet was received. The constant gain controller and the linearized second order model are described in detail with reference to FIG. 4. The process 500 may incorporate a number of network parameters and a number of queue parameters, such as, for example, the queue size q, the threshold T, a maximum queue size (denoted as B), and the like, as discussed in detail below. The packet drop controller 206 then may provide the drop/mark probability $p_d$ to the probability comparator 210.

At step 308, the probability comparator 210 compares the drop/mark probability $p_d$ with the random probability $p_r$. If the random probability $p_r$ is less than or equal to the drop/mark probability $p_d$ (i.e., $p_r \leq p_d$) then the probability comparator 210 may send a drop signal to the packet add/drop module 202 to direct the packet add/drop module 202 to drop (or mark) the packet (illustrated as dropped packet 226, FIG. 2) at step 310. In certain packet-network implementations, such as TCP/IP, the dropping of packets may constitute a signal to the sources of the dropped packets to reduce their sending rates, thereby reducing the congestion at the input of the network device.

Otherwise, if the random probability $p_r$ is greater than the drop/mark probability $p_d$ (i.e., $p_r > p_d$) then the probability comparator 210 may send an accept signal to the packet add/drop module 202 to direct the packet add/drop module 202 to provide the packet (illustrated as accepted packet 224, FIG. 2) to the queue 204 for storage at step 312. The process 300 terminates at step 314 until another incoming packet is received at the network device, at which time steps 302-314 may be repeated for the incoming packet.

Figure 4:
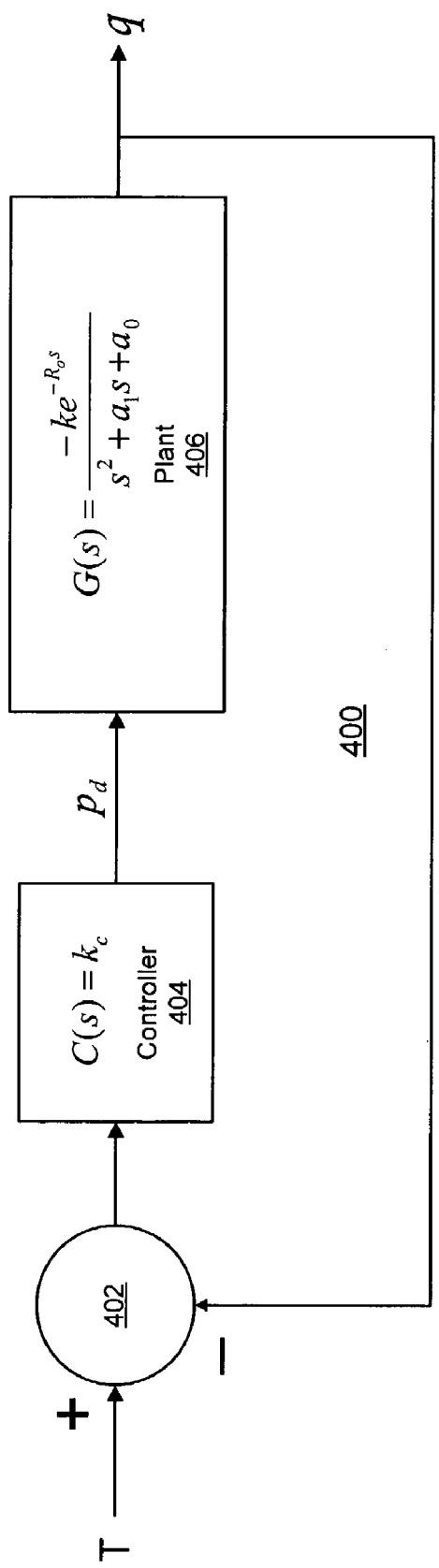
FIG. 4 is a flow diagram illustrating an exemplary closed-loop feedback system representative of the AQM mechanism of FIG. 2 in accordance with at least one embodiment of the present invention.

Referring now to FIG. 4, a closed-loop control system 400 representing an exemplary operation of the mechanism 200/process 300 is illustrated in accordance with at least one embodiment of the present invention. The behavior of the queue system 200 may be represented by the closed-loop control system 400 having a comparator 402, controller 404, and plant 406. The plant 406, in one embodiment, represents the behavior of the packet-based network, including the routers, switches, and other network devices that generate, receive, and or transmit packet-based data in the system 100 of FIG. 1. The controller 404, in one embodiment, represents the behavior of the packet drop controller 206 of FIG. 2 whereby adjustments may be made to the plant 406 through the value selected by the drop/mark probability $P_d$, where the value providing the desired outcome may be selected using one or more techniques described herein. The actual queue size q resulting from the input of the drop/mark probability $P_d$ to the plant 406 then may be fed back to the comparator 402, whereupon the actual queue size q is compared with the threshold T to produce an error signal e(n). Based at least in part on this error signal, the controller 404 may update the drop/mark probability $P_d$ for the next iteration.

As noted above, the drop/mark probability $P_d$ may be determined based at least in part on a dynamic model of the packet-based network used to transmit/receive packets. In at least one embodiment, this dynamic model may described as coupled, non-linear differential equations to describe a dynamic TCP model:

$$\dot{W}(t) = \frac{1}{R(t)} - \frac{W(t)W(t-R(t))}{2R(t-R(t))} p(t-R(t)) \qquad \text{EQ. 1}$$

$$\dot{q}(t) = \frac{W(t)}{R(t)} N(t) - C \qquad \text{EQ. 2}$$

where $\dot{x}$ denotes the time derivative of x; W represents the expected TCP window size (in packets); q represents the expected queue size (in packets); R represents the round trip time $$\left(R = \frac{q}{C} + T_P\right);$$

$T_P$ represents propagation delay (in seconds); C represents the link capacity (in packets/second); N represents the number of TCP connections; and p represents the drop/mark probability. The queue length q and the window size W may be positive and bounded quantities, i.e., $q \in [0, q_{max}]$ and $W \in [0, W_{max}]$ where $q_{max}$ and $W_{max}$ denote the buffer capacity and the maximum window size, respectively.

Non-linear terms in differential equations, in some instances, may be approximated by linear terms or zero-order (constant) terms over limited ranges of the system response or system forcing function. In either case, one or more linear differential equations can be obtained as approximations of the non-linear system, valid over the same limited operating ranges. Accordingly, in at least one embodiment, the non-linear dynamic equations EQs. 1 and 2 may be approximated by their small-signal linearization about an operating point and designed with a linear control system for the approximation such that, at least in the neighborhood of the operating point, the design is substantially stable (even in the presence of feedback delay). A discussion of the approximation follows.

Assuming a constant number of TCP flows $N(t)=N$ and a constant round-trip time $R(t)=R_0$, the following linear differential equations may be derived:

$$\delta \dot{W}(t) = -\frac{N}{R_0^2 C}(\delta W(t) + \delta W(t - R_0)) - \frac{R_0 C^2}{2N^2} \delta p(t - R_0) \quad \text{EQ. 3}$$

$$\delta \dot{q}(t) = \frac{N}{R_0} \delta W(t) - \frac{1}{R_0} \delta q(t) \quad \text{EQ. 4}$$

where
$\delta W \doteq W - W_0$
$\delta q \doteq q - q_0$
$\delta p \doteq p - p_0$ and the operating point $(W_0, q_0, p_0)$ may be defined by $\dot{W}=0$ and $\dot{q}=0$, i.e., $$\dot{W} = 0 \Rightarrow W_0^2 p_0 = 2 \quad \text{EQ. 5}$$

$$\dot{q} = 0 \Rightarrow W_0 = \frac{R_0 C}{N} \quad \text{EQ. 6}$$

$$R_0 \doteq \frac{q_0}{C} + T_p. \quad \text{EQ. 7}$$

EQ. 3 may be approximated by:

$$\delta \dot{W}(t) = -\frac{2N}{R_0^2 C} \delta W(t) - \frac{R_0 C^2}{2N^2} \delta p(t - R_0). \quad \text{EQ. 8}$$

and from EQs. 4, EQ. 9 may be obtained:

$$\delta \dot{W}(t) = \frac{R_0}{N} \delta \ddot{q}(t) + \frac{1}{N} \delta \dot{q}(t). \quad \text{EQ. 9}$$

Now substituting $\delta W(t)$ from EQ. 4 and $\delta \dot{W}(t)$ from EQ. 9 into EQ. 8, EQ. 10 may be obtained:

$$\delta \ddot{q}(t) + a_1 \delta \dot{q}(t) + a_0 \delta q(t) = -k \delta p(t - R_0) \quad \text{EQ. 10}$$

where the parameters $a_1$ and $a_0$ and the steady-state gain parameter k of the plant may be defined as:

$$a_1 = \frac{R_0 C + 2N}{R_0^2 C} \quad \text{EQ. 11}$$

$$a_0 = \frac{2N}{R_0^3 C} \quad \text{EQ. 12}$$

$$k = \frac{C^2}{2N}. \quad \text{EQ. 13}$$

From EQ. 10, the transfer function of the network may be expressed as:

$$G(s) = \frac{Q(s)}{P(s)} = \frac{-k}{s^2 + a_1 s + a_0} e^{-R_0 s} \quad \text{EQ. 14}$$

where Q(s) and P(s) are the Laplace transforms of $\delta q(t)$ and $\delta p(t)$, respectively.

In at least one embodiment, the transfer function of the plant 406 may be expressed by EQ. 14 and the controller 404 may be implemented as a constant gain (proportional) controller, i.e., $$C(s) = k_c \quad \text{EQ. 15}$$

where the value of the constant gain factor $k_c$ preferably is selected so that the closed-loop system 400 is substantially stable. Despite the relative simplicity of the model, the stability analysis of the resulting closed-loop system 400 typically is a relatively complicated problem due to the presence of an infinite number of roots of the characteristic equation. An analysis of the stability of the system 400 follows.

At the outset, it may be appropriate to summarize the process for determining an appropriate value or range of values for the constant gain factor $k_c$. As discussed below, the set of all stable values for $k_c$ of a packet drop/mark controller for a plant 406 with transfer function G(s) (EQ. 14) may be given as:

a) If $(R_0 C + 2N)^2 \geq 4 N R_0 C$, then $$-\frac{2N(R_0 C + 2N) z_1}{(R_0 C)^3 \sin(z_1)} < k_c < \frac{4N^2}{(R_0 C)^3},$$

where $z_1$ is the solution of the equation $$\cot(z) = \frac{z^2 - 2N/R_0 C}{z(R_0 C + 2N)/R_0 C}$$

in the interval $(0, \pi)$.

b) If $(R_0 C + 2N)^2 < 4 N R_0 C$, then $$\max_{j=od, od+2} \left\{ -\frac{2N(R_0 C + 2N) z_j}{(R_0 C)^3 \sin(z_j)} \right\} < k_c < \min_{j=ev, ev+2} \left\{ -\frac{2N(R_0 C + 2N) z_j}{(R_0 C)^3 \sin(z_j)} \right\},$$

where $z_j$ is the solution of the equation $$\cot(z) = \frac{z^2 - 2N/R_0C}{z(R_0C + 2N)/R_0C}$$

in the interval $((j-1)\pi, \pi)$;

$$z_{\min} = R_0\sqrt{a_0 - \frac{a_1^2}{2}};$$

od is an odd natural number defined as $$od = \underset{j\,\text{odd}}{\operatorname{argmin}}\{z_{\min} - z_j\}$$

subject to $z_{min}-z_j \geq 0$, and ev is an even natural number or zero defined as $$ev = \underset{j\,\text{even}}{\operatorname{argmin}}\{z_{\min} - z_j\}$$

subject to $z_{min}-z_j \geq 0$. A detailed discussion of the development of the above process for determining the constant gain factor $k_c$ follows.

Time delays or transportation lag factors are very common in many control systems. The presence of the time delays can lead to dynamic models with characteristic equations of the form $$F(s) = d(s) + e^{-sT_1}n_1(s) + e^{-sT_2}n_2(s) + \ldots + e^{-sT_m}n_m(s) \qquad \text{EQ. 16}$$

where $d(s)$ and $n_i(s)$ for $i=1, 2, \ldots, m$ are polynomials with real coefficients. Characteristic equations of this form are also known as quasipolynomials. It can be shown that the Hermite-Biehler Theorem for Hurwitz polynomials does not carry over to arbitrary functions $f(s)$ of the complex variables. Functions of the form $H(s,e^s)$, where $H(s,t)$ is a polynomial in two variables are often referred to as a quasipolynomial. A suitable extension of the Hermite-Biehler Theorem can be developed to study the stability of certain classes of quasipolynomials characterized as follows. If the following assumptions are made in EQ. 16:

$\deg[d(s)]=n$ and $\deg[n_i(s)] \leq n$ for $i=1, 2, \ldots, m$,
$0 < T_1 < T_2 < \ldots < T_m$, then instead of EQ. 16, the quasipolynomial $$F^*(s) = e^{sT_m}F(s) = e^{sT_m}d(s) + e^{s(T_m-T_1)}n_1(s) + e^{s(T_m-T_2)}n_2(s) + \ldots n_m(s) \qquad \text{EQ. 17}$$

may be considered.

Because $e^{sT_m}$ does not have any finite roots, the roots of $F(s)$ are identical to those of $F^*(s)$. The quasipolynomial $F^*(s)$, however, has a principal term, i.e., the coefficients of the term containing the highest powers of $s$ and $e^s$ are nonzero. It then follows that this quasipolynomial is either of the delay (i.e., retarded) or of the neutral type. From this, it may be concluded that the stability of the system 400 with characteristic equation EQ. 16 is equivalent to the condition that all the roots of $F^*(s)$ be in the open left-half plane.

Equivalently, it may be said that $F^*(s)$ is Hurwitz or stable. The necessary and sufficient conditions for the stability of $F^*(s)$ are set out below.

Let $F^*(s)$ be given by EQ. 17, resulting in:

$$F^*(j\omega) = F_r(\omega) + jF_i(\omega) \qquad \text{EQ. 18}$$

where $F_r(\omega)$ and $F_i(\omega)$ represent the real and imaginary parts of $F^*(s)$, respectively. Under the assumptions noted above, $F^*(s)$ is stable if and only if: $F_r(\omega)$ and $F_i(\omega)$ have only simple real roots and these interlace; and $\dot{F}_i(\omega_0)F_r(\omega_0) - F_i(\omega_0)\dot{F}_r(\omega_0) > 0$, for some $\omega_0$ in $(-\infty,\infty)$ where $\dot{F}_r(\omega)$ and $\dot{F}_i(\omega)$ denote the first derivative with respect to $\omega$ of $F_r(\omega)$ and $F_i(\omega)$, respectively.

One aspect in ascertaining stability is to ensure that $F_r(\omega)$ and $F_i(\omega)$ have only real roots. Such a property can be ensured by using the following result.

Let M and L denote the highest powers of $s$ and $e^s$, respectively, in $F^*(s)$. Let $\eta$ be an appropriate constant such that the coefficients of the terms of highest degree in $F_r(\omega)$ and $F_i(\omega)$ do not vanish at $\omega=\eta$. Then for the equations $F_r(\omega)=0$ or $F_i(\omega)=0$ to have only real roots, it is necessary and sufficient that in the intervals $-2l\pi+\eta \leq \omega \leq 2l\pi+\eta$, $l=1, 2, 3, \ldots$ $F_r(\omega)$ or $F_i(\omega)$ have exactly $4lL+M$ real roots starting with a sufficiently large l.

The stability of the closed-loop system 400 may be determined as follows. The system 400 may be analyzed without time delay, i.e., $R_0=0$. In this case, the closed-loop characteristic equation of the system may be given by:

$$F(s) = s^2 + a_1 s + (a_0 - kk_c) \qquad \text{EQ. 19}$$

For this second-order polynomial, the necessary and sufficient conditions that the controller and the plant parameters have to satisfy to guarantee the stability of the closed-loop system may be determined. Solving the characteristic equation EQ. 19, EQ. 20 results:

$$s = \frac{-a_1 \pm \sqrt{a_1^2 - 4(a_0 - kk_c)}}{2}. \qquad \text{EQ. 20}$$

From EQ. 20, if $a_1^2 \geq 4(a_0 - kk_c)$, then the system has all real roots which lie strictly in the left half-plane. If $a_1^2 < 4(a_0 - kk_c)$, then the system has complex roots that also lie strictly in the left half-plane. Thus, if it is assumed that $k>0$ and $a_0>0$, the system is stable for the following conditions:

$$a_1 > 0 \qquad \text{EQ. 21}$$

$$4(a_0 - kk_c) > 0 \Rightarrow k_c < \frac{a_0}{k}. \qquad \text{EQ. 22}$$

In terms of the network parameters EQ. 22 gives the following condition:

$$k_c < \frac{4N^2}{(R_0C)^3}. \qquad \text{EQ. 23}$$

Next, consider the case where the time delay of the plant model is different from zero, i.e., $R_0>0$. The closed-loop characteristic equation of the system is then $$F(s) = s^2 + a_1 s + a_0 - kk_c e^{-R_0 s} \qquad \text{EQ. 24.}$$

In order to study the stability of the closed-loop system, it should be determined if all the roots of EQ. 24 lie in the open left half plane. The presence of the exponential term $e^{-R_0 s}$ results in the number of roots of F(s) being infinite and this makes the stability check very difficult. A simplified procedure for determining the set of all stabilizing gains $k_c$ is explained as follows.

First, consider the quasipolynomial F*(s) defined by $$F^*(s) = e^{R_0 s} F(s) = (s^2 + a_1 s + a_0) e^{R_0 s} - k k_c \qquad \text{EQ. 25}$$

Substituting $s = j\omega$ results in:

$$F^*(j\omega) = F_r(\omega) + j F_i(\omega) \qquad \text{EQ. 26}$$

where $$F_r(\omega) = (a_0 - \omega^2) \cos(R_0 \omega) - a_1 \omega \sin(R_0 \omega) - k k_c \qquad \text{EQ. 27}$$

$$F_i(\omega) = (a_0 - \omega^2) \sin(R_0 \omega) + a_1 \omega \cos(R_0 \omega) \qquad \text{EQ. 28}$$

For convenience of analysis, the following change of variables, $z = R_0 \omega$, may be made. Thus, the real and imaginary parts of $F^*(j\omega)$ may be rewritten as $$F_r(z) = \left(a_0 - \frac{z^2}{R_0^2}\right)\cos(z) - \frac{a_1 z}{R_0}\sin(z) - k k_c \qquad \text{EQ. 29}$$

$$F_i(z) = \left(a_0 - \frac{z^2}{R_0^2}\right)\sin(z) + \frac{a_1 z}{R_0}\cos(z). \qquad \text{EQ. 30}$$

Two conditions may be checked to ensure the stability of the quasipolynomial F*(s). First, the following may be checked:

$$E(\omega_0) = \dot{F}_i(\omega_0) F_r(\omega_0) - \dot{F}_r(\omega_0) F_i(\omega_0) > 0 \qquad \text{EQ. 31}$$

for some $\omega_0$ in $(-\infty, \infty)$. Taking $\omega_0 = z_0 = 0$, for instance, gives $F_r(z_0) = a_0 - k k_c$ and $F_i(z_0) = 0$. The following also may be obtained:

$$\dot{F}_r(z_0) = 0 \qquad \text{EQ. 32}$$

$$\dot{F}_i(z) = \left(a_0 - \frac{z^2}{R_0^2} + \frac{a_1}{R_0}\right)\cos(z) - \left(\frac{2z}{R_0^2} + \frac{a_1 z}{R_0}\right)\sin(z) \qquad \text{EQ. 33}$$

$$\dot{F}_i(z_0) = \left(a_0 + \frac{a_1}{R_0}\right). \qquad \text{EQ. 34}$$

From EQs. 32-34, EQ. 35 may be determined:

$$E(z_0) = \left(a_0 + \frac{a_1}{R_0}\right)(a_0 - k k_c). \qquad \text{EQ. 35}$$

From the conditions $a_1 > 0$, $a_0 > 0$ and $(a_0 - k k_c) > 0$ $$\left(\text{or } k_c < \frac{a_0}{k}\right),$$

it may be observed that $E(z_0) > 0$.

Another check may involve the interlacing of the roots of $F_r(z)$ and $F_i(z)$. The roots of the imaginary part, i.e., $F_i(z) = 0$ can may be determined from EQ. 30, resulting in:

$$F_i(z) = \left(a_0 - \frac{z^2}{R_0^2}\right)\sin(z) + \frac{a_1 z}{R_0}\cos(z) = 0. \qquad \text{EQ. 36}$$

From EQ. 36, it may be observed that $z_0 = 0$ is a root of $F_i(z)$. It is also verifiable that $l\pi$, $l = 1, 2, 3, \ldots$, are not roots of $F_i(z)$. Thus, for $z \neq 0$, EQ. 37 may be obtained:

$$\cot(z) = \frac{z^2 - R_0^2 a_0}{R_0 a_1 z}. \qquad \text{EQ. 37}$$

EQ. 37 may be expressed in terms of the network parameters as $$\cot(z) = \frac{z^2 - 2N/R_0 C}{z(R_0 C + 2N)/R_0 C}. \qquad \text{EQ. 38}$$

Since an analytical solution to either of EQs. 37 and 38 is difficult, a plot of the two terms in the equations (cot(z) and $$\left.\frac{z^2 - R_0^2 a_0}{R_0 a_1 z}\right)$$

can be used to understand the nature of the real solution. From EQs. 11 and 12 it may be observed that $R_0 a_0 < a_1$, so $$\frac{z^2 - R_0^2 a_0}{R_0 a_1 z}$$

may be plotted for arbitrarily selected values of $a_0$, $a_1$ and $R_0$ that satisfy this condition. The general nature of the curve of $$\frac{z^2 - R_0^2 a_0}{R_0 a_1 z},$$

however, does not change with the use of other values. Arranged in increasing order of magnitude, the positive real roots of EQ. 37 may be denoted by $z_j$, $j = 1, 2, 3, \ldots$. It will be appreciated that non-negative real roots of the imaginary part $F_i(z)$ should satisfy:

$$z_1 \in (0, \pi), z_2 \in (\pi, 2\pi), z_3 \in (2\pi, 3\pi), z_4 \in (3\pi, 4\pi), \ldots \qquad \text{EQ. 39}$$

$F_r(z)$ also should have only real roots. Let us substitute $s_1 = R_0 s$ in the expression for F*(s) in EQ. 25. This results in:

$$F^*(s_1) = (s_1^2 + a_1 s_1 + a_0) e^{s_1} - k k_c \qquad \text{EQ. 40}$$

It may be observed the new quasipolynomial in $s_1$ provides that M=2 and L=1. Assuming $$\eta = \frac{\pi}{4}$$

to satisfy the requirement that $F_i(z)$ does not vanish $\omega=\eta$, the following observations may be made from a plot of the two terms in EQ. 38: in the interval $$\left[0, 2\pi - \frac{\pi}{4}\right] = \left[0, \frac{7\pi}{4}\right],$$

$F_i(z)=_0$ has three real roots including a root at the origin $z_0=0$; it is seen that $F_i(z)$ is an odd function in the interval $$\left[-\frac{7\pi}{4}, \frac{7\pi}{4}\right],$$

$F_i(z)$ has five real roots; and $F_i(z)$ has one real root in $$\left[\frac{7\pi}{4}, \frac{9\pi}{4}\right].$$

Thus, $F_i(z)$ has $4L+M=6$ real roots in the interval $$\left[-2\pi + \frac{\pi}{4}, 2\pi + \frac{\pi}{4}\right].$$

Furthermore, $F_i(z)$ has 2 real roots in each of the intervals $$\left[2l\pi + \frac{\pi}{4}, 2(l+1)\pi + \frac{\pi}{4}\right]$$

and $$\left[-2(l+1)\pi + \frac{\pi}{4}, -2l\pi + \frac{\pi}{4}\right]$$

for $l=1, 2, 3, \ldots$. Hence it follows that $F_i(z)$ has exactly $4lL+M$ real roots in the interval $$\left[-2l\pi + \frac{\pi}{4}, 2l\pi + \frac{\pi}{4}\right]$$

for $l=1, 2, 3, \ldots$, which implies that $F_i(z)$ has only real roots.

$F_r(z)$ now may be evaluated at the roots of the imaginary part $F_i(z)$. For $z_0=0$, $F_r(z_0)=a_0-kk_c$. Using EQ. 29, for $z_j$, $j=1, 2, 3, \ldots$ the following may be obtained:

$$F_r(z_j) = \frac{R_0^2 a_0 - z_j^2}{R_0^2}\cos(z_j) - \frac{a_1 z_j}{R_0}\sin(z_1) - kk_c. \quad \text{EQ. 41}$$

Using EQ. 37 in EQ. 41 results in:

$$\begin{aligned}F_r(z_j) &= -\frac{a_1 z_j}{R_0 \sin(z_j)}\cos^2(z_j) - \frac{a_1 z_j}{R_0}\sin(z_j) - kk_c \\ &= -\frac{a_1 z_j}{R_0 \sin(z_j)}[1 - \sin^2(z_j)] - \frac{a_1 z_j}{R_0}\sin(z_j) - kk_c \\ &= -\frac{a_1 z_j}{R_0 \sin(z_j)} - kk_c\end{aligned} \quad \text{EQ. 42}$$

Thus, EQ. 43 may be obtained:

$$F_r(z_j) = -k[k_c + M(z_j)] \quad \text{EQ. 43}$$

where $$M(z_j) = \frac{a_1 z_j}{kR_0 \sin(z_j)}. \quad \text{EQ. 44}$$

From the results above, $$k_c < \frac{a_0}{k}$$

and $F_r(z_0)=a_0-kk_c>0$. Therefore, interlacing of the roots of $F_r(z)$ and $F_i(z)$ is equivalent to $F_r(z_1)<0$, $F_r(z_2)>0$, $F_r(z_3)<0$ and so on. Using this principle, the result $F_r(z_0)=a_0-kk_c>0$ and EQ. 43, the following result:

$$F_r(z_0) > 0 \Rightarrow k_c < \frac{a_0}{k}$$

From the above, the following observations may be made: from EQ. 39, it may be seen that $z_j$ for odd values of j (1, 3, 5, ...), are either in the first or the second quadrant. Thus, for odd values of j, $\sin(z_j)>0$ and from EQ. 44, $M(z_j)>0$ for odd values of the parameter j; and it may be seen from EQ. 39 that $z_j$ for even values of j, (2, 4, 6, ...) are either in the third or the fourth quadrant. Thus, for even values of j, $\sin(z_j)<0$ and from EQ. 44, $M(z_j)<0$ for even values of the parameter j. All the set of inequalities obtained above can now be rewritten as:

$$k_c < \frac{a_0}{k} \quad \text{EQ. 45}$$

$$\max_{j=1,3,5,\ldots}\{M_j\} < k_c < \min_{j=2,4,6,\ldots}\{M_j\} \quad \text{EQ. 46}$$

From EQ. 37 and the well-known relationship $1+\cot^2(z)=\csc^2(z)$, EQ. 47 results:

$$\sin(z) = \pm\sqrt{\frac{1}{1+\cot^2(z)}} = \pm R_0 a_1 z \frac{1}{\sqrt{(z^2 - R_0^2 a_0)^2 + R_0^2 a_1^2 z^2}}. \quad \text{EQ. 47}$$

From above, it was demonstrated that $z_j$, $j=1, 2, 3, \ldots$, are solutions of EQ. 37. Using EQ. 47, $M(z_j)$ can be rewritten as:

$$M(z_j) = \pm \frac{1}{kR_0^2}\sqrt{(z_j^2 - R_0^2 a_0)^2 + R_0^2 a_1^2 z_j^2} =$$
$$\pm \frac{1}{kR_0^2}\sqrt{z_j^4 + R_0^2(a_1^2 - 2a_0)z_j^2 + R_0^4 a_0^2} \qquad \text{EQ. 48}$$

where, according to the above-discussed observations, the plus sign (+) may be used for odd values of j and the minus sign (−) may be used for even values of j.

There are two situations of interest in EQs. 14 and 24. Case 1: $a_1^2 \geq 2a_0$ (which, equivalently, in terms of the network parameters, is $(R_0C+2N)^2 \geq 4NR_0C$). From EQ. 48, it is observed that $M(z_j)$ is a monotonically increasing function for odd values of j (1, 3, 5, . . . ) and is a monotonically decreasing function for even values of j (0, 2, 4, 6, . . . ) and that $$M(0) = \frac{a_0}{k}.$$

From these observations, the bounds for $k_c$ in EQs. 45 and 46 may be expressed as:

$$-\frac{a_1 z_1}{kR_0 \sin(z_1)} < k_c < \frac{a_0}{k}, z_1 \in (0, \pi) \qquad \text{EQ. 49}$$

which may be expressed in terms of the network parameters as $$-\frac{2N(R_0C+2N)z_1}{(R_0C)^3 \sin(z_1)} < k_c < \frac{4N^2}{(R_0C)^3}, z_1 \in (0, \pi). \qquad \text{EQ. 50}$$

Case 2: $a_1^2 < 2a_0$ (which, equivalently, in terms of the network parameters, is $(R_0C+2N)^2 < 4NR_0C$). The function $M(z_j)$ has a minimum at:

$$\frac{dM(z)}{dz} = \qquad \text{EQ. 51}$$
$$4z^3 + 2R_0^2(a_1^2 - 2a_0)z = 0 \Rightarrow z_{min} = R_0 \sqrt{a_0 - \frac{a_1^2}{2}}.$$

The function $M(z_j)$ is monotonically decreasing in the interval $[0, z_{min})$ and monotonically increasing in the interval $[z_{min}, \infty)$. The $z_j$, j odd, that minimizes $z_{min} - z_j$ subject to $z_j \leq z_{min}$ is denoted as $z_{od}$, where od is an odd natural number. $z_{ev}$, where ev is an even natural number or zero, denotes the $z_j$, j even or zero, that minimizes $z_{min} - z_j$ subject to $z_j \leq z_{min}$. These conditions may be expressed as follows:

$$od = \underset{j\text{ odd}}{\operatorname{argmin}}\{z_{min} - z_j\} \text{ subject to } z_{min} - z_j \geq 0 \qquad \text{EQ. 52}$$

$$ev = \underset{j\text{ even}}{\operatorname{argmin}}\{z_{min} - z_j\} \text{ subject to } z_{min} - z_j \geq 0. \qquad \text{EQ. 53}$$

The bound for $k_c$ in EQ. 46 can then be expressed as:

$$\max_{j=od, od+2}\left\{-\frac{a_1 z_j}{kR_0 \sin(z_j)}\right\} < k_c < \min_{j=ev, ev+2}\left\{-\frac{a_1 z_j}{kR_0 \sin(z_j)}\right\} \qquad \text{EQ. 54}$$

where for odd values of j, $\sin(z_j) > 0$ and for even values of j, $\sin(z_j) < 0$.

In terms of the network parameters, EQ. 54 may be expressed as:

$$\max_{j=od, od+2}\left\{-\frac{2N(R_0C+2N)z_j}{(R_0C)^3 \sin(z_j)}\right\} < \qquad \text{EQ. 55}$$
$$k_c < \min_{j=ev, ev+2}\left\{-\frac{2N(R_0C+2N)z_j}{(R_0C)^3 \sin(z_j)}\right\}.$$

For the values of $k_c$ in these ranges, the interlacing property and the fact that the root of $F_i(z)$ are all real may be shown to guarantee that $F_r(z)$ also has only real roots.

Figure 5:
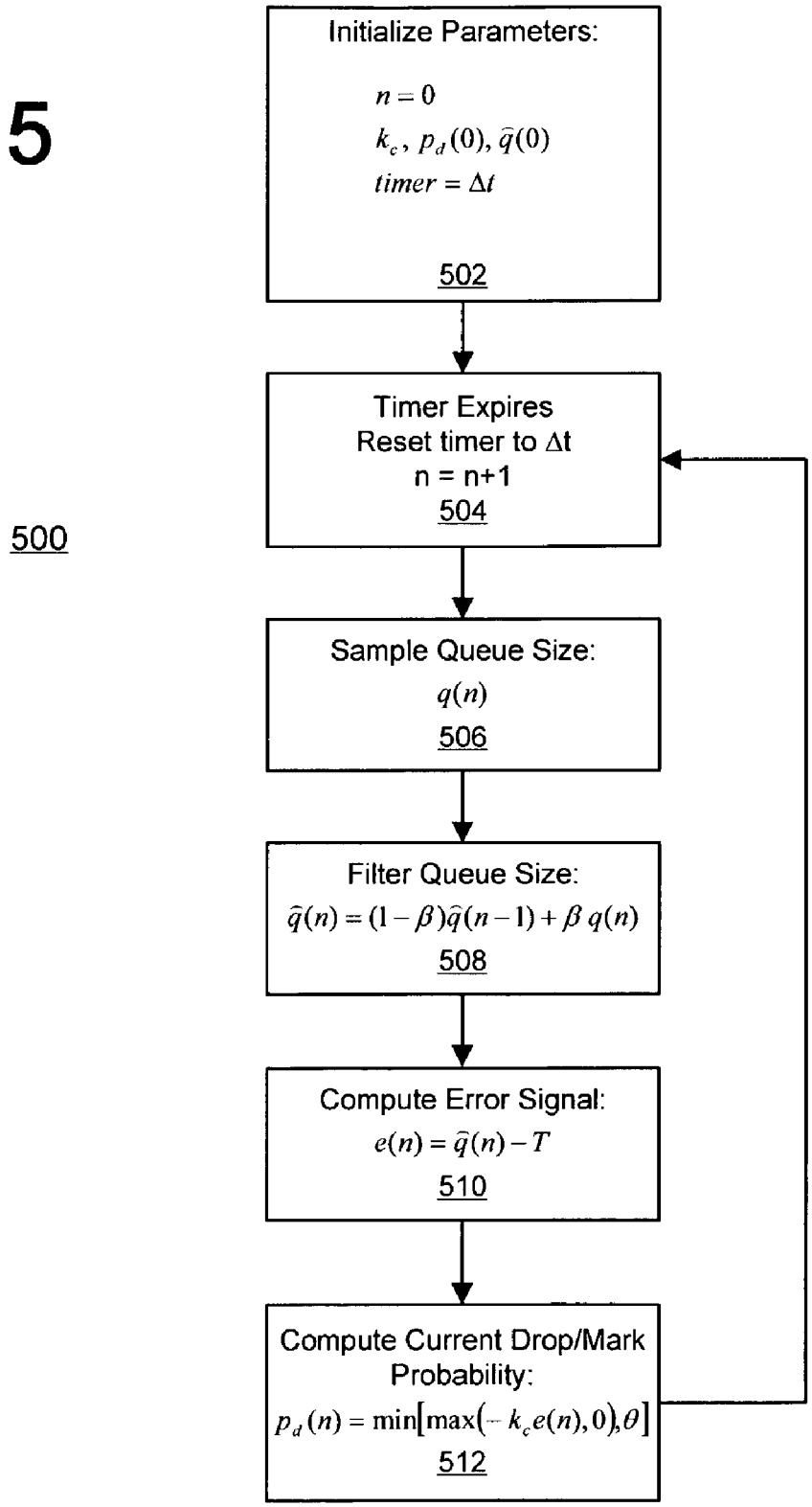
FIG. 5 is a flow diagram illustrating an exemplary process for determining a drop/mark probability for an incoming packet in accordance with at least one embodiment of the present invention.

Referring now to FIG. 5, an exemplary process 500 for determining a drop/mark probability $p_d$ is illustrated in accordance with at least one embodiment of the present invention. In at least one embodiment, process 500 is implemented at step 306 (FIG. 3) of process 300 in determining drop/mark probability $p_d$ for subsequent comparison with a random probability $p_r$ at step 308 (FIG. 3). For the following, it is assumed for ease of illustration that the actual queue size q in the network device to be sampled every Δt units of time (seconds), and the packet drop controller 206 provides a new value of the drop probability $p_d$ every Δt units of time. The interval Δt, therefore, is the sampling/control interval of the system. The control system will now be described in discrete time. In other instances, however, the actual queue size q may be sampled every 'x' number of packets received. In this case, the interval Δt may represent this interval of 'x' packets.

The process 500 initiates at step 502, whereby various parameters are initialized. This initialization (at iteration time n=0) typically includes: setting a timer to a certain interval Δt, where the interval Δt can be denoted as a time interval (e.g., every x milliseconds), as a packet interval (e.g., every x packets received), and the like; and determining an initial drop/mark probability $p_d(0)$. Additionally, the constant gain factor $k_c$ may be determined in accordance with the process 600 described below with reference to FIG. 6.

At step 504, the timer is triggered by a lapse of the interval Δt (i.e., x milliseconds have passed or x packets have been received), which triggers the performance of the steps 506-512 by the packet drop controller 206 (FIG. 2). Further, at step 504, the timer may be reset to the interval Δt indicating an advance to the next iteration time n=n+1.

At step 506, the actual size the queue at iteration n (q(n)) may be determined. Due to the burstiness of the network traffic and other perturbations, the actual queue size may fluctuate considerably. Accordingly, filtering of the actual queue size q(n) preferably is performed at step 508. In at least one embodiment, a exponentially weighted moving average (EWMA) filter with gain 0<β<1 may be utilized to filter the actual queue size. The filtered queue size may be determined using the EWMA filter as:

$$\hat{q}(n) = (1-\beta)\hat{q}(n-1) + \beta q(n) \qquad \text{EQ. 56}$$

where $\hat{q}(n)$ represents the resulting filtered queue size, $\hat{q}(n-1)$ represents the filtered queue size from the previous iteration, and $\beta$ represents a filter gain having a value between 0 and 1. While one embodiment of the present invention implements a first EWMA filter, such as a filter represented by EQ. 56, to minimize fluctuation in the measured queue size, other filtering techniques may be implemented by those skilled in the art using the guidelines provided herein.

At step 510, the error $e(n)$ between the filtered queue size $\hat{q}(n)$ and the threshold T may be determined using the following:

$$e(n) = \hat{q}(n) - T \qquad \text{EQ. 57.}$$

Alternatively, if the actual queue size is to be used rather than the filtered queue size, the error $e(n)$ may be determined as the difference between the actual queue size $q(n)$ and the threshold T.

Based at least in part on the constant gain factor $k_c$ of the constant gain controller 404 (FIG. 4) and the error $e(n)$, the drop/mark probability $P_d(n)$ for the current iteration n may be determined at step 512. In at least one embodiment, the drop/mark probability $P_d(n)$ may be calculated as the negative product of the constant gain factor $k_c$ and the error $e(n)$ or:

$$P_d(n) = -k_c e(n) \qquad \text{EQ. 58}$$

if the resulting product is less than or equal to 0 (i.e., $-k_c e(n) < \theta$) and greater than or equal to zero (i.e., $-k_c e(n) \geq 0$), where $\theta$ represents a maximum assignable drop/mark probability such that $\theta \in [0,1]$. In at least one embodiment, $\theta$ preferably has a value of 1. Otherwise, if the negative product is less than zero (i.e., $-k_c e(n) < 0$), then the drop/mark probability $P_d(n)$ may be set to zero, and if the negative product is greater than $\theta$ (i.e., $-k_c e(n) > \theta$), the drop/mark probability $P_d(n)$ may be set to $\theta$. This determination of the drop/mark probability $P_d(n)$ may be represented in equation form as:

$$Pd(n) = \min[\max(-k_c e(n), 0), \theta], \theta \in [0,1] \qquad \text{EQ. 59.}$$

The drop/mark probability $P_d(n)$ determined for iteration n at step 512 may be supplied from the packet drop controller 206 (FIG. 2) to the probability comparator 210 (FIG. 2) for comparison with a random probability $P_r(n)$, as described above with reference to step 308 of process 300 (FIG. 3).

Figure 6:
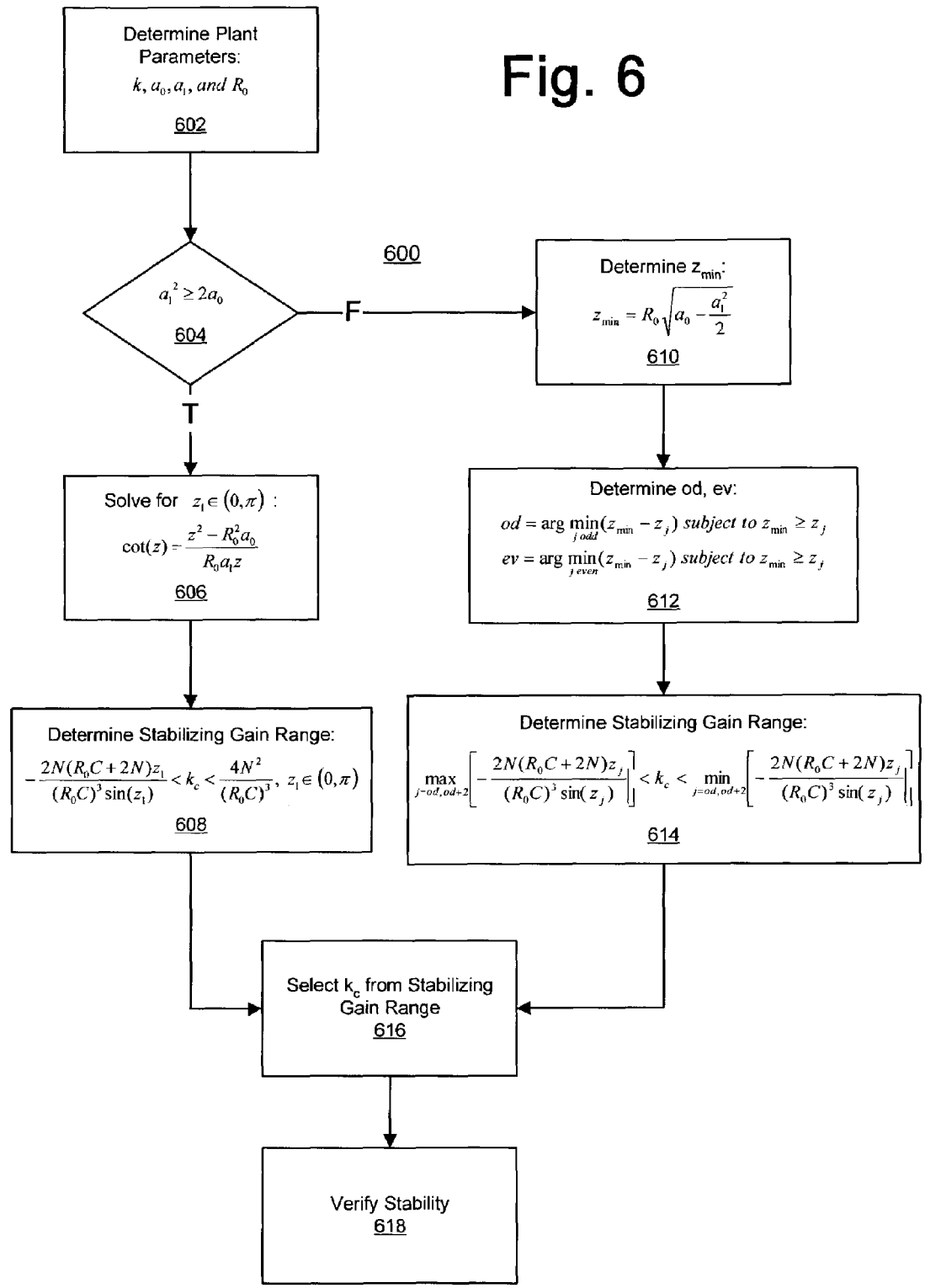
FIG. 6 is a flow diagram illustrating an exemplary process for determining a constant gain factor for use in the process of FIG. 5 in accordance with at least one embodiment of the present invention.

Referring now to FIG. 6, an exemplary process 600 for determining an appropriate value for the constant gain factor $k_c$ utilizing the linearized second order model described in FIG. 4 is illustrated in accordance with at least one embodiment of the present invention. As noted above, in at least one embodiment, the constant gain factor $k_c$ of the constant gain controller 404 (FIG. 4) may be used to determine a drop/mark probability $P_d$ (e.g., step 512, FIG. 5). This drop/mark probability $P_d$ then may be compared against a random probability or other predetermined probability to determine whether a particular incoming packet should be accepted into a queue or discarded. Also as noted above, in at least one embodiment, the constant gain factor $k_c$ may be derived from a linearized second-order model of the operation and behavior of the packet-based network (i.e., plant 406, FIG. 4) to which a network device utilizing the present invention is connected.

The process 600 for determining the constant gain factor $k_c$ initiates at step 602, where various parameters may be determined and/or initialized. These parameters may include various parameters used by the plant 406 of the closed-loop feedback system 400 representing the active queue management process, as discussed above with reference to FIG. 4. Examples of such parameters include: the propagation delay $T_p$, the link capacity C (in packets/second, for example); the number N of network connections (e.g., TCP connections); etc. From these parameters, the parameters $k$, $a_0$, $a_1$ and the round trip time $R_0$ may be determined from the equations discussed above with reference to FIG. 4, where:

$$R_0 = \frac{q}{C} + T_p \qquad \text{EQ. 7}$$

$$k = \frac{C^2}{2N} \qquad \text{EQ. 13}$$

$$a_0 = \frac{2N}{R_0^3 C} \qquad \text{EQ. 12}$$

$$a_1 = \frac{R_0 C + 2N}{R_0^2 C}. \qquad \text{EQ. 11}$$

At step 604, the following comparison may be evaluated:

$$a_1^2 \geq 2a_0 \qquad \text{EQ. 60.}$$

If the evaluation is true, the process 600 may proceed to steps 606 and 608 for determining an appropriate range from which $k_c$ may be selected. At step 606, EQ. 37 may be solved for $z_1 \in (0,\pi)$:

$$\cot(z) = \frac{z^2 - R_0^2 a_0}{R_0 a_1 z}. \qquad \text{EQ. 37}$$

Using the value of $z_1$ determined at step 606, an appropriate range from which the constant gain factor $k_c$ may be determined at step 608 as:

$$-\frac{a_1 z_1}{k R_0 \sin(z_1)} < k_c < \frac{a_0}{k}, \ z_1 \in (0, \pi). \qquad \text{EQ. 49}$$

EQ. 49 may be denoted in network parameters as:

$$-\frac{2N(R_0 C + 2N)z_1}{(R_0 C)^3 \sin(z_1)} < k_c < \frac{4N^2}{(R_0 C)^3}, \ z_1 \in (0, \pi). \qquad \text{EQ. 50}$$

If the comparison at step 604 is determined to be false for the identified parameters, the appropriate range for the constant gain factor $k_c$ may be determined from steps 610-614. At step 610, the parameter $z_{min}$ may be determined from EQ. 51:

$$z_{min} = R_0 \sqrt{a_0 - \frac{a_1^2}{2}} \qquad \text{EQ. 51}$$

in the interval $z_{min} \in (0,\pi)$.

At step 612, the odd natural number od and the even natural number ev may be computed using the value of $z_{min}$ from step 610 in the following equations:

$$od = \underset{j \text{ odd}}{\operatorname{argmin}}\{z_{\min} - z_j\} \text{ subject to } z_{\min} - z_j \geq 0 \qquad \text{EQ. 52}$$

$$ev = \underset{j \text{ even}}{\operatorname{argmin}}\{z_{\min} - z_j\} \text{ subject to } z_{\min} - z_j \geq 0. \qquad \text{EQ. 53}$$

where $z_j$ is the solution to EQ. 37 in the interval $z_j \epsilon((j-1)\pi, j\pi)$, $j=1, 2, 3, \ldots$. The roots of EQ. 37 may be useful in determining od and ev.

At step 614, the values for od and ev determined at step 612 may be used to determine the appropriate range from which the constant gain factor $k_c$ may be selected, where the appropriate range may be given as:

$$\max_{j=od,od+2}\left\{-\frac{a_1 z_j}{k R_0 \sin(z_j)}\right\} < k_c < \min_{j=ev,ev+2}\left\{-\frac{a_1 z_j}{k R_0 \sin(z_j)}\right\}. \qquad \text{EQ. 54}$$

At step 616, a value for the constant gain factor $k_c$ may be selected from the appropriate range determined either at step 608 or step 614 (depending on the evaluation at step 604). Prior to utilizing the selected value for the constant gain factor $k_c$, it may be appropriate to verify the stability of the system 400 using the selected value by verifying the interlacing property of $F_r(\omega)$ and $F_{ir}(\omega)$ (EQ. 18). Accordingly, at step 618 $F^*(s)$ (EQ. 17) may be constructed using the selected value for the constant gain factor $k_c$. By substituting $s=j\omega$ in EQ. 17 and then plotting the real and imaginary parts of $F^*(s)$, the stability provided by the selected value may be verified should the real and imaginary parts interlace. If not, another value for $k_c$ may be selected from the range of values at step 616 and the stability verified at step 618 until an appropriate value is identified for the constant gain factor $k_c$.

At this point, the selected value for the constant gain factor $k_c$ may be utilized in process 500 (FIG. 5) in determining a drop/mark probability $P_d$. In turn, drop/mark probability $P_d$ may be used in process 300 (FIG. 3) to facilitate the decision whether a received packet should be dropped or allowed to be stored in the queue 204 (FIG. 2).

Referring now to FIG. 7, Table 1 having exemplary ranges of the constant gain factor $k_c$ for a variety of network configurations is illustrated in accordance with at least one embodiment of the present invention. Although Table 1 illustrates a number of exemplary ranges for the constant gain factor $k_c$, those skilled in the art may utilize the techniques described above to determine alternate or additional ranges for the constant gain factor $k_c$ using the guidelines provided herein.

At this point, it should be noted that implementing an AQM mechanism in accordance with the present invention as described above typically involves the processing of input data and the generation of output data to some extent. This input data processing and output data generation may be implemented in hardware or software. For example, specific electronic components may be employed in a node or similar or related circuitry for implementing an AQM mechanism in accordance with the present invention as described above. Alternatively, one or more processors operating in accordance with stored instructions may implement the functions associated with implementing an AQM mechanism in accordance with the present invention as described above. If such is the case, it is within the scope of the present invention that such instructions may be stored on one or more processor readable media, or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. In a device having a queue to buffer packets between segments of a network, a method for generating a drop probability for an incoming packet comprising:
   receiving an incoming packet;
   determining, upon receipt of the incoming packet, a size of the queue;
   determining an error based at least in part on a difference between the queue size and a threshold; and
   generating a drop probability for the incoming packet based at least in part on the error and a constant gain factor.

2. The method as in claim 1, further comprising filtering the queue size using an exponentially weighted moving average (EWMA) filter to generate a filtered queue size and wherein the error is determined based on a difference between the filtered queue size and the threshold.

3. The method as in claim 2, wherein the queue size is filtered based on the equation:

$$\hat{q}(n) = (1-\beta)\hat{q}(n-1) + \beta q(n)$$

where $q(n)$ represents the queue size, $\hat{q}(n)$ represents the filtered queue size at a current time instant, $\hat{q}(n-1)$ represents a filtered queue size of a previous time instant and $\beta$ represents a filter gain value between 0 and 1.

4. The method as in claim 1, wherein the drop probability is determined based on an equation:

$$P_d(n) = \min[\max(-k_c e(n), 0), \theta]$$

where $P_d(n)$ represents the drop probability for the incoming packet, $e(n)$ represents the error, $k_c$ represents the constant gain factor and $\theta$ represents a value between 0 and 1.

5. The method as in claim 1, wherein the constant gain factor is selected from a range of values:

$$-\frac{2N(R_0 C + 2N)z_1}{(R_0 C)^3 \sin(z_1)} < k_c < \frac{4N^2}{(R_0 C)^3}$$

where N represents a number of connections to the network device, C represents a link capacity of the network, $R_0$ represents a round trip time of a packet in the network, and $z_1$ represents a solution to $$\cot(z_1) = \frac{z_1^2 - 2N/R_0C}{z_1(R_0C + 2N)/R_0C}$$

such that $z_1 \in (0,\pi)$.

6. The method as in claim 1, wherein the constant gain factor is selected from a range of values:

$$\max_{j=od,od+2}\left\{-\frac{2N(R_0C+2N)z_j}{(R_0C)^3\sin(z_j)}\right\} <$$
$$k_c < \min_{j=ev,ev+2}\left\{-\frac{2N(R_0C+2N)z_j}{(R_0C)^3\sin(z_j)}\right\}$$

where N represents a number of connections to the network device, C represents a link capacity of the network, $R_0$ represents a round trip time of a packet in the network, $z_j$ is a solution of the equation $$\cot(z) = \frac{z^2 - 2N/R_0C}{z(R_0C + 2N)/R_0C}$$

in the interval $((j-1)\pi, j\pi)$; od is an odd natural number defined as $$od = \underset{j\,odd}{\operatorname{argmin}}\{z_{min} - z_j\}$$

subject to $z_{min} - z_j \geq 0$, and ev is an even natural number or zero defined as $$ev = \underset{j\,even}{\operatorname{argmin}}\{z_{min} - z_j\}$$

subject to $z_{min} - z_j \geq 0$ and $$z_{min} = R_0\sqrt{\frac{2N}{R_0^3C} - \frac{\left(\frac{R_0C+2N}{R_0^2C}\right)^2}{2}}.$$

7. The method as in claim 1, wherein the drop probability is implemented in an active queue management (AQM) mechanism to manage the queue.

8. The method as in claim 1, wherein the network includes a Transport Control protocol (TCP)-based network.

9. The method as in claim 1, wherein the constant gain factor is based at least in part on a linearized second order dynamic model of the network.

10. At least one processor readable medium for storing a computer program of instructions configured to be readable by at least one processor for instructing the at least one processor to execute a computer process for performing the method as in claim 1.

11. In a device having a queue to buffer packets between segments of a network, a method for managing the queue comprising:

generating, for an incoming packet, a drop probability based at least in part on a linearized second order dynamic model of the network;

comparing the drop probability with a random probability; and dropping the incoming packet when the drop probability is less than or equal to the random probability.

12. The method as in claim 11, wherein the drop probability is determined based on an equation:

$$P_d(n) = \min[\max(-k_c e(n), 0), \theta]$$

where $P_d(n)$ represents the drop probability for the incoming packet, e(n) represents an error between a size of the queue and a threshold, $\theta$ represents a value between 0 and 1, and $k_c$ represents a constant gain factor based at least in part on the linearized second order dynamic model.

13. The method as in claim 12, wherein the constant gain factor is selected from a range of values:

$$-\frac{2N(R_0C+2N)z_1}{(R_0C)^3\sin(z_1)} < k_c < \frac{4N^2}{(R_0C)^3}$$

where N represents a number of connections to the network device, C represents a link capacity of the network, $R_0$ represents a round trip time of a packet in the network, and $z_1$ represents a solution to $$\cot(z_1) = \frac{z_1^2 - 2N/R_0C}{z_1(R_0C + 2N)/R_0C}$$

such that $z_1 \in (0,\pi)$.

14. The method as in claim 12, wherein the constant gain factor is selected from a range of values:

$$\max_{j=od,od+2}\left\{-\frac{2N(R_0C+2N)z_j}{(R_0C)^3\sin(z_j)}\right\} <$$
$$k_c < \min_{j=ev,ev+2}\left\{-\frac{2N(R_0C+2N)z_j}{(R_0C)^3\sin(z_j)}\right\}$$

where N represents a number of connections to the network device, C represents a link capacity of the network, $R_0$ represents a round trip time of a packet in the network, $z_j$ is a solution of the equation $$\cot(z) = \frac{z^2 - 2N/R_0C}{z(R_0C + 2N)/R_0C}$$

in the interval $((j-1)\pi, j\pi)$; od is an odd natural number defined as $$od = \underset{j\,odd}{\operatorname{argmin}}\{z_{min} - z_j\}$$

subject to $z_{min} - z_j \geq 0$, and ev is an even natural number or zero defined as $$ev = \underset{j \, even}{\arg\min} \{z_{\min} - z_j\}$$

subject to $z_{min}-z_j \geqq 0$ and $$z_{\min} = R_0 \sqrt{\frac{2N}{R_0^3 C} - \frac{\left(\frac{R0C + 2N}{R_0^2 C}\right)^2}{2}}.$$

15. The method as in claim 11, wherein the network includes a Transport Control Protocol (TCP)-based network.

16. At least one processor readable medium for storing a computer program of instructions configured to be readable by at least one processor for instructing the at least one processor to execute a computer process for performing the method as in claim 11.

17. In a device having a queue to buffer packets between segments of a network, a queue management apparatus comprising:
   a packet drop controller configured to determine a drop probability for an incoming packet based at least in part on an error between a size of the queue and a threshold and a constant gain factor; and
   an add/drop module operably connected to the queue controller and is configured to drop the incoming packet when the drop probability is less than or equal to a random probability.

18. The queue management apparatus as in claim 17, wherein the drop probability is determined based on an equation:

$$P_d(n) = \min[\max(-k_c e(n), 0), \theta]$$

where $P_d(n)$ represents the drop probability for the incoming packet, $e(n)$ represents the error between a size of the queue and a threshold, $\theta$ represents a value between 0 and 1, and $k_c$ represents the constant gain factor.

19. The queue management apparatus as in claim 17, wherein the constant gain factor is selected from a range of values:

$$-\frac{2N(R_0C + 2N)z_1}{(R_0C)^3 \sin(z_1)} < k_c < \frac{4N^2}{(R_0C)^3}$$

where N represents a number of connections to the network device, C represents a link capacity of the network, $R_0$ represents a round trip time of a packet in the network, and $z_1$ represents a solution to $$\cot(z_1) = \frac{z_1^2 - 2N/R_0C}{z_1(R_0C + 2N)/R_0C}$$

such that $z_1 \in (0, \pi)$.

20. The queue management apparatus as in claim 17, wherein the constant gain factor is selected from a range of values:

$$\underset{j=od,od+2}{\max} \left\{ -\frac{2N(R_0C + 2N)z_j}{(R_0C)^3 \sin(z_j)} \right\} <$$
$$k_c < \underset{j=ev,ev+2}{\min} \left\{ -\frac{2N(R_0C + 2N)z_j}{(R_0C)^3 \sin(z_j)} \right\}$$

where N represents a number of connections to the network device, C represents a link capacity of the network, $R_0$ represents a round trip time of a packet in the network, $z_j$ is a solution of the equation $$\cot(z) = \frac{z^2 - 2N/R_0C}{z(R_0C + 2N)/R_0C}$$

in the interval $((j-1)\pi, j\pi)$; od is an odd natural number defined as $$od = \underset{j \, odd}{\arg\min} \{z_{\min} - z_j\}$$

subject to $z_{min}-z_j \geqq 0$, and ev is an even natural number or zero defined as $$ev = \underset{j \, even}{\arg\min} \{z_{\min} - z_j\}$$

subject to $z_{min}-z_j \geqq 0$ and $$z_{\min} = R_0 \sqrt{\frac{2N}{R_0^3 C} - \frac{\left(\frac{R0C + 2N}{R_0^2 C}\right)^2}{2}}.$$

21. The queue management apparatus as in claim 17, wherein the network includes a Transport Control protocol (TCP)-based network.

22. The queue management apparatus as in claim 17, wherein the constant gain factor is based at least in part on a linearized second order dynamic model of the network.

* * * * *